United States Patent
Hamilton et al.

(10) Patent No.: US 10,691,560 B2
(45) Date of Patent: Jun. 23, 2020

(54) REPLACEMENT OF STORAGE DEVICE WITHIN IOV REPLICATION CLUSTER CONNECTED TO PCI-E SWITCH

(71) Applicant: Lenovo Enterprise Solutions (Singapore) PTE. LTD., New Tech Park (SG)

(72) Inventors: Jeffrey Ross Hamilton, Morrisville, NC (US); James Joseph Parsonese, Morrisville, NC (US); Pravin Patel, Morrisville, NC (US)

(73) Assignee: LENOVO ENTERPRISE SOLUTIONS (SINGAPORE) PTE. LTD, New Tech Park (SG)

( * ) Notice: Subject to any disclaimer, the term of this patent is extended or adjusted under 35 U.S.C. 154(b) by 201 days.

(21) Appl. No.: 15/857,067

(22) Filed: Dec. 28, 2017

(65) Prior Publication Data

US 2019/0205224 A1 Jul. 4, 2019

(51) Int. Cl.
| | |
|---|---|
| *G06F 11/00* | (2006.01) |
| *G06F 11/16* | (2006.01) |
| *G06F 13/42* | (2006.01) |
| *G06F 13/40* | (2006.01) |
| *G06F 3/06* | (2006.01) |
| *G06F 11/20* | (2006.01) |
| *G06F 11/22* | (2006.01) |

(52) U.S. Cl.
CPC .......... *G06F 11/1616* (2013.01); *G06F 3/065* (2013.01); *G06F 3/0619* (2013.01); *G06F 3/0665* (2013.01); *G06F 3/0685* (2013.01); *G06F 11/1662* (2013.01); *G06F 11/2005* (2013.01); *G06F 11/2094* (2013.01); *G06F 11/221* (2013.01); *G06F 11/2221* (2013.01); *G06F 13/4022* (2013.01); *G06F 13/4282* (2013.01); *G06F 2201/85* (2013.01); *G06F 2213/0026* (2013.01)

(58) Field of Classification Search
CPC .............. G06F 11/2005; G06F 11/221; G06F 11/2221; G06F 2213/0026
See application file for complete search history.

(56) References Cited

U.S. PATENT DOCUMENTS

| | | | | |
|---|---|---|---|---|
| 2006/0239287 | A1* | 10/2006 | Johnsen | H04L 12/4625 370/412 |
| 2006/0242333 | A1* | 10/2006 | Johnsen | G06F 13/4022 710/30 |
| 2006/0242352 | A1* | 10/2006 | Torudbakken | G06F 13/4022 710/312 |

(Continued)

*Primary Examiner* — Charles Ehne
(74) *Attorney, Agent, or Firm* — Kunzler Bean & Adamson; Bruce R. Needham

(57) ABSTRACT

Storage devices are connected to a Peripheral Component Interconnect Express (PCIe) switch and form an input/output virtualization (IOV) replication cluster that can be exposed to a host processor via hardware root complex interconnecting the PCIe switch to the host processor. When a failed storage device is replaced with a new storage device, the new storage device can initiate a virtual root complex that connects to those storage devices containing data that was replicated on the failed storage device, to receive and copy the data on the new storage device. This replication process does not have to involve the hardware root complex or the host processor.

20 Claims, 5 Drawing Sheets

(56) References Cited

U.S. PATENT DOCUMENTS

| | | | |
|---|---|---|---|
| 2009/0113430 A1* | 4/2009 | Riley | G06F 9/468 |
| | | | 718/101 |
| 2012/0265910 A1* | 10/2012 | Galles | G06F 13/4022 |
| | | | 710/300 |
| 2017/0068637 A1* | 3/2017 | Lais | G06F 13/16 |
| 2017/0337069 A1* | 11/2017 | Huang | G06F 9/4411 |

* cited by examiner

REPLACEMENT OF STORAGE DEVICE WITHIN IOV REPLICATION CLUSTER CONNECTED TO PCI-E SWITCH

BACKGROUND

Data is the lifeblood of many entities like business and governmental organizations, as well as individual users. At a granular level, data is stored on individual storage devices, such as magnetic disk drives and solid-state drives (SSDs). Such storage devices include physical storage media, such as rotatable magnetic platters or solid-state semiconductor memory, on which the devices store data. For redundancy and other purposes, a number of such storage devices may be abstracted as a single logical storage volume, to which host computing devices like servers write data. The host computing devices may themselves manage the constituent storage devices of the logical storage volumes, or may be uninvolved in how the logical storage volumes are implemented using storage devices.

SUMMARY

An example non-transitory computer-readable data storage medium stores program code executable by a storage device replacing another storage device of a number of storage devices connected to a Peripheral Component Interconnect Express (PCIe) switch. The code is executable by the storage device to determine that the storage device is part of an input/output virtualization (IOV) replication cluster along with other storage devices of the storage devices. The code is executable by the storage device to, in response to determining that the storage device was part of the IOV replication cluster, initiate a virtual root complex on the storage device. The code is executable by the storage device to initiate, by the virtual root complex, a connection with each other storage device containing data to be replicated on the storage device, as an endpoint to the virtual root complex. The code is executable by the storage device to receive and store, by the virtual root complex, the data to be replicated on the storage device from each other storage device containing the data, over the connection. The code is executable by the storage device to terminate, by the virtual root complex, the connection with each other storage device containing the data. The code is executable by the storage device to, after terminating the connection with each other storage device containing the data, disable the virtual root complex on the storage device and enabling the storage device as another endpoint.

An example system includes a PCIe switch connectable to a hardware root complex that is connected to a host processor. The system includes storage devices connected to the PCIe switch and forming an IOV replication cluster as exposed to the host processor via the hardware root complex. Each storage device is an endpoint to the hardware root complex. Upon replacement of a failed storage device of the storage devices with a new storage device, the new storage device is to initiate connections with other storage devices of the storage devices that contain data that was replicated on the failed storage device, and receive and store the data.

An example storage device includes a port to connect to a PCIe switch to which a number of other storage devices are connected. The storage device includes one or more physical storage media on which the storage device is to store data. The storage device includes hardware logic to, upon connection of storage device to the PCIe switch, determine that the storage device is to become part of an IOV replication cluster with the other storage devices. The hardware logic is to responsively initiate connections with the other storage devices that contain the data to be replicated on the storage device. The hardware logic is to, after initiating the connections, receive and store the data from the other storage devices that contain the data. The hardware logic is to, after receiving and storing the data, terminate the connections with the other storage devices that contain the data.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DETAILED DESCRIPTION

Figure 1:
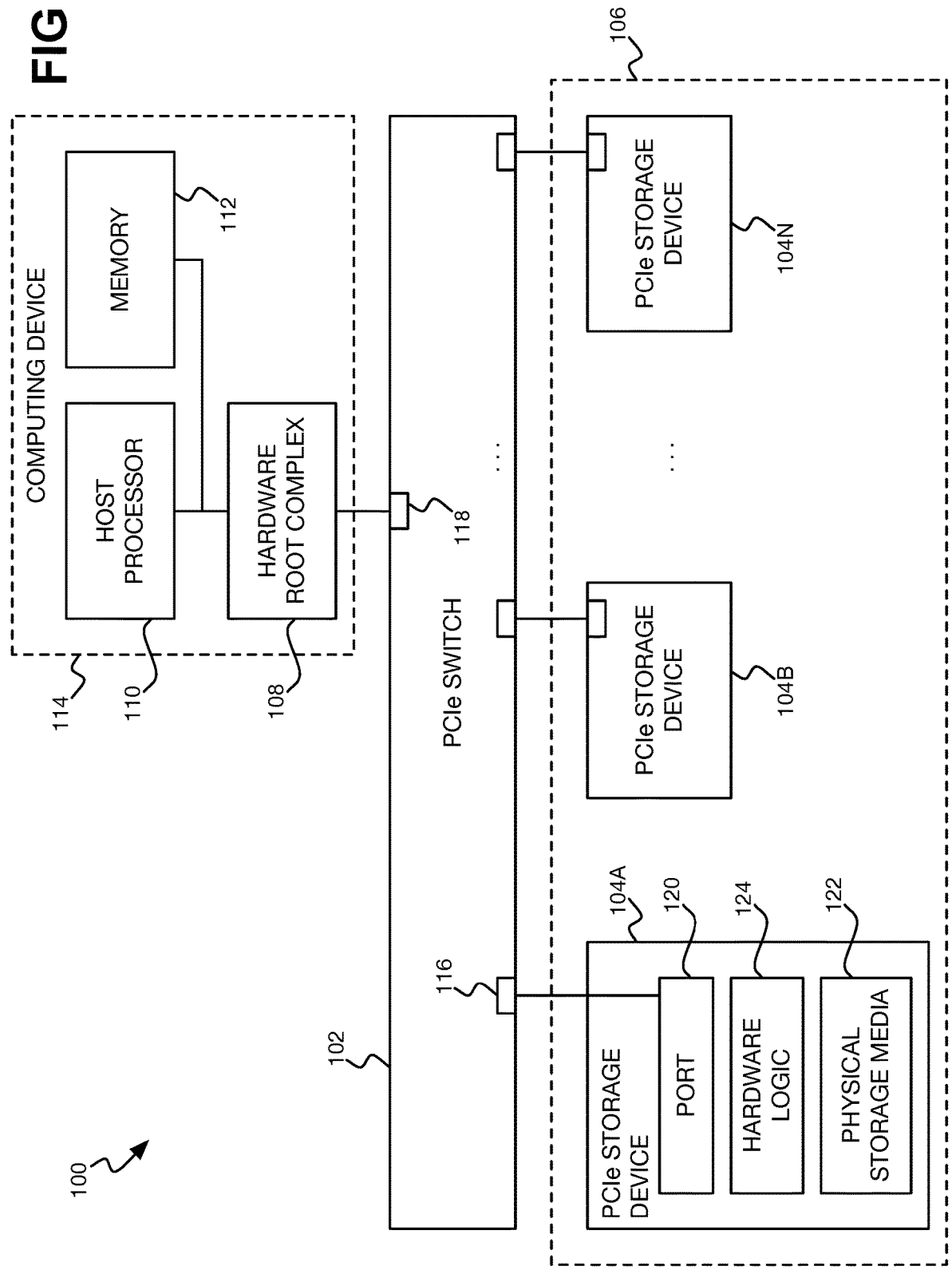
FIG. 1 is a diagram of an example system including Peripheral Component Interconnect Express (PCIe) storage devices connected to a PCIe and that can form a replication cluster.

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the embodiment of the invention is defined only by the appended claims.

As noted in the background section, storage devices that include physical storage media can be abstracted as a single logical storage volume for redundancy and other purposes. Examples of storage devices include Peripheral Component Internet Express (PCIe or PCI-E) storage devices, which can connect to a PCIe switch that in turn is connected to a hardware root complex to which a processor and memory of a host computing device may be connected. The PCIe storage devices may be part of an enclosure that connects to the PCIe switch. PCIe is a high-speed serial computer expansion bus used to interconnect peripheral devices like storage devices.

The PCIe storage devices can be part of an input/output virtualization (IOV) replication cluster. IOV is a technology that uses software to abstract upper-layer protocols from physical connections or physical transports. IOV thus separates logical from physical resources, permitting the PCIe storage devices connected to a PCIe switch to be aggregated and accessed as a shared pool of storage devices, including as a single logical volume. Redundant array of independent disk (RAID) and other redundancy approaches may be implemented on a replication cluster.

When a PCIe storage device of a replication cluster of PCIe storage devices connected to the same PCIe switch fails, the storage device is disconnected from the PCIe switch and a replacement PCIe storage device connected in its place. The data that the failed storage device was storing then has to be copied from one or more other storage devices of the replication cluster onto the replacement storage device. Once the data has been copied onto the replacement storage device, redundancy within the replication cluster is again maintained.

Generally, the host processor connected to the root complex that is connected to the PCIe switch to which the PCIe storage devices of the replication cluster performs this copying of data onto the replacement PCIe storage device. However, this process is inefficient at best, and can place a processing or other burden on the host processor, which can slow down other tasks that the processor is performing. For example, for a given data block to be copied from a particular PCIe storage device to the replacement PCIe storage device, the data block moves from the former storage device, through the PCIe switch, through the hardware root complex and to the host processor. The data block then moves from the host processor, through the PCIe switch, through the hardware root complex, and to the replacement storage device.

Techniques described herein alleviate this and other shortcomings when a PCIe storage device is replaced within a replication cluster of PCIe storage devices connected to a common PCIe switch that is connected to a hardware root complex to which a host processor can be connected. The newly replaced PCIe storage device can initiate a temporary virtual root complex that determines which other storage devices of the replication cluster store data that should be copied to the new PCIe storage device, and then performs this copying. As such, a given data block to be copied from a particular PCIe storage device to the replacement PCIe storage device moves from the former storage device, through the PCIe switch, and to the later storage device. The host processor and the hardware root complex are not involved in this process.

FIG. 1 shows an example system 100. The system 100 includes a PCIe switch 102. The system 100 includes multiple PCIe storage devices 104A, 104B, . . . , 104N, which are collectively referred to as the PCIe storage devices 104. The PCIe storage devices 104 may be physically contained within an enclosure 106. The system 100 includes a hardware root complex 108, and a host processor 110, and can include physical memory 112. The hardware root complex 108, the host processor 110, and the physical memory 112 may be part of a computing device 114.

The PCIe switch 102 includes PCIe ports 116 that physically connect the PCIe switch 102 to the PCIe storage devices 104. Each PCIe port 116 corresponds to a different PCIe storage device 104. The PCIe switch 102 also includes a PCIe port 118 that physically connects the PCIe switch 102 to the hardware root complex 108. The PCIe switch 102 is thus a switch that has a number of PCIe ports, to provide for port expansion as well as other functionality.

Of the PCIe storage devices 104, the storage device 104A is described herein in detail, but the other storage devices 104 are similar. The storage device 104A is a PCIe storage device 104 in that the storage device 104 is intended to store data, and is connectable to a PCIe switch fabric, such as via the PCIe switch 102. The PCIe storage device 104 includes a PCIe port 120 that physically connects the PCI storage device 104A to the PCIe 102. For instance, a cable can interconnect the port 116 of the PCIe switch 102 to the port 120 of the storage device 104A.

The PCIe storage device 104A includes one or more physical storage media 122. The storage media 122 may be flash semiconductor memory, such that the storage device 104A is a solid state device (SSD). The storage media 122 may be magnetic media, such that the storage device 104 is a hard disk drive (HDD). The storage device 104A is generally intended to store data for computing devices like the computing device 114, and in this respect stores such data on the storage media 122.

The PCIe storage device 104A includes hardware logic 124. The hardware logic 124 may be implemented as program code stored on a non-transitory computer-readable data storage medium of the hardware logic 124. The program code may be executed by a processor of the hardware logic 124. In another implementation, the program code may be implemented as an application-specific integrated circuit (ASIC) of the hardware logic 124, a field-programmable gate array (FPGA) of the logic 124, and so on. In all such implementations, it can be said that the PCIe storage device 104A executes the program code.

The hardware root complex 108 is the hardware that generates transaction requests on behalf of the host processor 110 for the PCIe switch fabric that includes the PCIe switch 102, and thus which can be intended for the PCIe storage devices 104. The transaction requests can be read, write, and management requests, for instance. The hardware root complex 108 can be on a local bus interconnecting the root complex 108 to the host processor 110 and the memory 112, which may be system memory of the computing device 114. As depicted in FIG. 1, the root complex 108 is a discrete device, but may be integrated as part of the host processor 110 in another implementation.

Via the hardware root complex 108 and through the PCIe switch 102, the host processor 110 may virtualize the PCIe storage devices 104 using IOV, as an IOV replication cluster. The IOV replication cluster can be read from and written to by application programs running on the computing device 114 as an individual logical volume, and can provide a degree of redundancy for data stored on the storage devices 104. For instance, in accordance with a RAID technique, if one storage device 104 were to fail, no data would be lost, and a new, replacement storage device 104 could be replace the failed storage device 104. The IOV replication cluster can implement other redundancy approaches as well.

Figure 2:
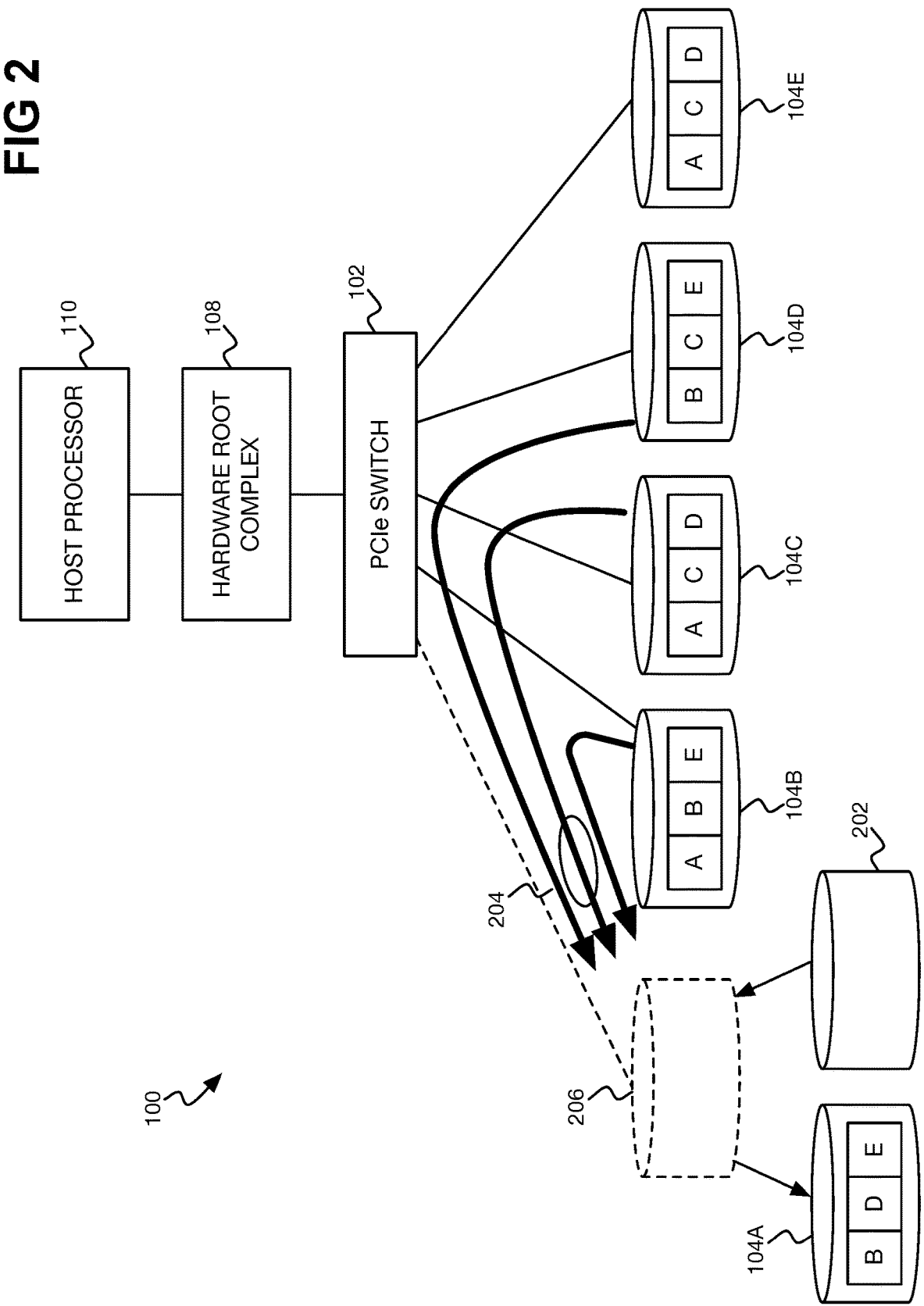
FIG. 2 is a diagram depicting an example of how data copying occurs within the replication cluster of FIG. 1 when a PCIe storage device is replaced.

FIG. 2 shows an example as to what occurs when a PCIe storage device 104 fails within the system 100. For illustrative clarity and convenience, not all aspects of the system 100 as described in relation to FIG. 1 are shown in FIG. 2. However, the PCIe switch 102, the hardware root complex 108, and the host processor 110 are depicted in FIG. 2. Furthermore, the PCIe storage devices 104 in FIG. 2 are depicted as specifically including five such storage devices 104A, 104B, 104C, 104D, and 104E, as well as a replacement PCIe storage device 202.

The host processor 110, through the hardware root complex 108 and the PCIe switch 102, virtualizes the PCIe storage device 104 within an IOV replication cluster. The IOV replication cluster stores data over five data stripes A, B, C, D, and E. Each data stripe is stored on three storage devices 104 for redundancy, and each storage device 104 stores three different data stripes. The data stripe A is stored on storage devices 104B, 104C, and 104E; the data stripe B is stored on storage devices 104A, 104B, and 104D; the data stripe C is stored on storage devices 104C, 104D, and 104E; the data stripe D is stored on storage devices 104A, 104C, and 104E; and the data stripe E is stored on storage devices 104A, 104B, and 104D.

In the example of FIG. 2, then, initially the storage device 104A is connected to the PCIe switch 102 at the location indicated by the dotted lines 206. The storage device 104A fails, disconnected from the PCIe switch 102, and the PCIe storage device 202 is connected to the PCIe switch 102 in place of the failed storage device 104A, again at the location indicated by the dotted lines 206. This may be achieved in a hot-plug manner, in which the system 100 does not have to be powered down when disconnection of the storage device 104A and the connection of the storage device 202 occur. The storage device 202 takes the storage devices 104A's place within the IOV replication cluster.

However, when the storage device 202 is first connected to the PCIe switch 102, and becomes part of the IOV replication cluster along with the storage devices 104 that have not failed, the storage device 202 does not have any of the data of the data stripes B, D, and E that were on storage device 104A. Therefore, the data stripes B, D, and E have to be copied onto the storage device 202 from at least some of the storage devices 104. As indicated by the arrows 204, in the particular example of FIG. 2, the data stripes B, D, and E are copied from the storage devices 104B, 104C, and 104D, and not from the storage device 104E.

The arrows 204 further indicate that the host processor 110 and the hardware root complex 108 are not involved in copying of the data from the PCIe storage devices 104 to the PCIe storage device 202 upon replacement of the failed PCIe storage device 104A with the storage device 202. Rather, the data directly moves from the PCIe storage devices 104 in question, through the PCIe switch 102, and to the PCIe storage device 202. The PCIe storage device 202 can initiate such data copying.

Figure 3:
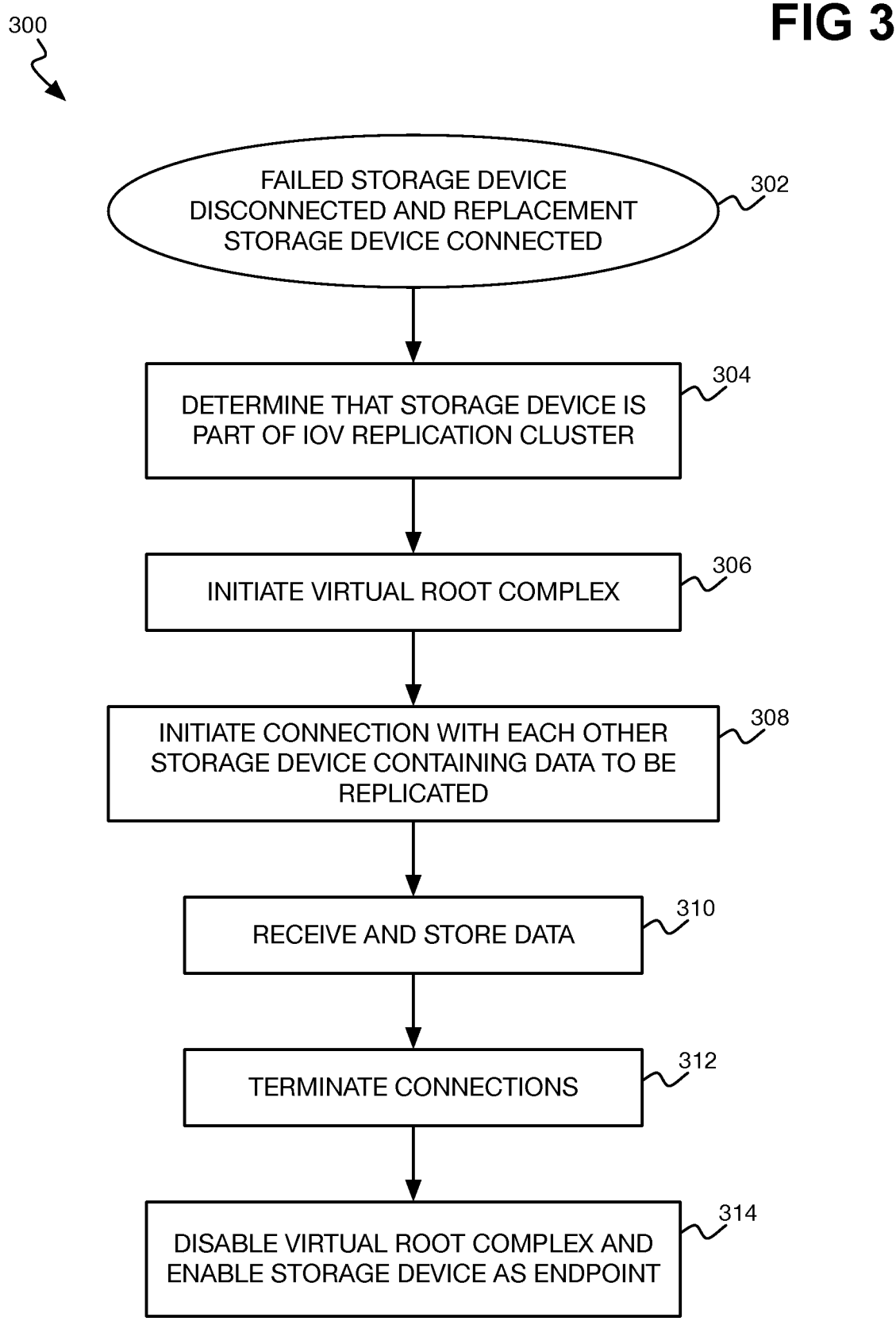
FIG. 3 is a flowchart of an example method for replacing a PCIe storage device within the replication cluster of FIG. 1.

FIG. 3 shows an example method 300 by which the data from the PCIe storage devices 104 can be copied to the replacement PCIe storage device 202 when the storage device 202 replaces the failed PCIe storage device 104A within the IOV replication cluster. The method 300 can be performed by the PCIe storage device 202, such as by the hardware logic 124 thereof. The method 300 begins when the failed storage device 104A is disconnected from the PCIe switch 102, and the replacement storage device 202 connected in its place to the switch 102 (302).

In response, the PCIe storage device 202 determines that the storage device 104A that it replaced was part of an IOV replication cluster (304). The PCIe switch 102, for instance, may expect that the storage device connected to the particular port 116 (i.e., the storage device 202) that replaced the failed storage device 104A that was previously connected to this port 116 will take the place of the storage device 104A within the replication cluster of which the storage device 104A was a part. Therefore, the PCIe storage device 202 may query the PCIe switch 102 once the storage device 202 has been connected to the switch 102 to learn how the device 202 should configure itself. In response, the PCIe switch 102 may indicate that the PCIe storage device 202 is to be part of the replication cluster.

Responsive to determining that the PCIe storage device 202 is to be part of the IOV replication cluster, the storage device 202 initiates a virtual root complex on the device 202 (306). The root complex that the storage device 202 initiates on itself is a virtual root complex because it is not a hardware device like the root complex 108 is. In one implementation, the IOV abstracting the storage devices 104 as a replication cluster is multiple root (MR) IOV. In this implementation, the virtual root complex on the storage device 202 can coexist with the hardware root complex 108; that is, the storage devices 104 can be endpoints to both the virtual root complex and the hardware root complex 108 simultaneously. The virtual root complex effectively supplements the hardware root complex 108.

In another implementation, the IOV abstracting the storage devices 104 as a replication cluster is single root (SR) IOV. In this implementation, there can be just one root complex to which the storage devices 104 are endpoints. Therefore, the PCIe switch 102 may instruct the hardware root complex 108 to temporarily disable itself (or the switch 102 may temporarily disable the root complex 108), or the initiation of the virtual root complex itself may result in disabling of the hardware root complex 108. The storage devices 104 therefore become endpoints to just the virtual root complex. The virtual root complex temporarily replaces (i.e., supplants) the hardware root complex 108 while the method 300 is performed.

The virtual root complex running on the PCIe storage device 202 then initiates connection with each other storage device 104 containing data that is to be copied to the storage device 202 (308). In the example of FIG. 2 that has been described, for instance, the virtual root complex may initiate connections with the PCIe storage devices 104B, 104C, and 104D, as the first three storage devices 104 that together include all the data stripes B, D, and E that the storage device 202 is to store. The storage devices 104 are connected to the PCIe storage device 202 as endpoints to the virtual root complex running on the storage device 202.

The virtual root complex copies the data from these storage devices 104 (310); that is, the virtual root complex receives the data from the storage devices 104 in question, and stores the data. Once the virtual root complex has finished copying the data, the PCIe storage device 202, the replication cluster has been repaired, and the storage device 202 no longer has to serve as a virtual root complex. Therefore, the virtual root complex terminates connections with the storage devices 104 (312). The virtual root complex may, for instance, query the PCIe switch 102 to request that the switch 102 disconnect the connections of the storage devices 104 as endpoints to the virtual root complex on the storage device 202.

The storage device 202 disables the virtual root complex, and is enabled as an endpoint to the hardware root complex 108 (314), so that the storage device 202 can actively participate as a member within the IOV replication cluster. If the IOV abstracting the remaining storage devices 104 and the storage device 202 is MR IOV, disabling the virtual root complex may leave the hardware root complex 108 as the only root complex within the system 100. Since the hardware root complex 108 is not disabled within MR IOV, nothing further has to be done.

However, if the IOV abstracting the remaining storage devices 104 and the storage device 202 is SR IOV, then once the virtual root complex has been disabled, and prior to enabling the storage device 202 as an endpoint, the hardware root complex 108 has to be enabled. As noted above, since there can be just one root complex within SR IOV, the hardware root complex 108 was temporarily disabled so that the storage devices 104 can be endpoints to the virtual root complex on the storage device 202. Therefore, after the virtual root complex has been disabled, the hardware root complex 108 is reenabled, with the storage devices 104 (and the storage device 202) being endpoints to the root complex 108.

Figure 4:
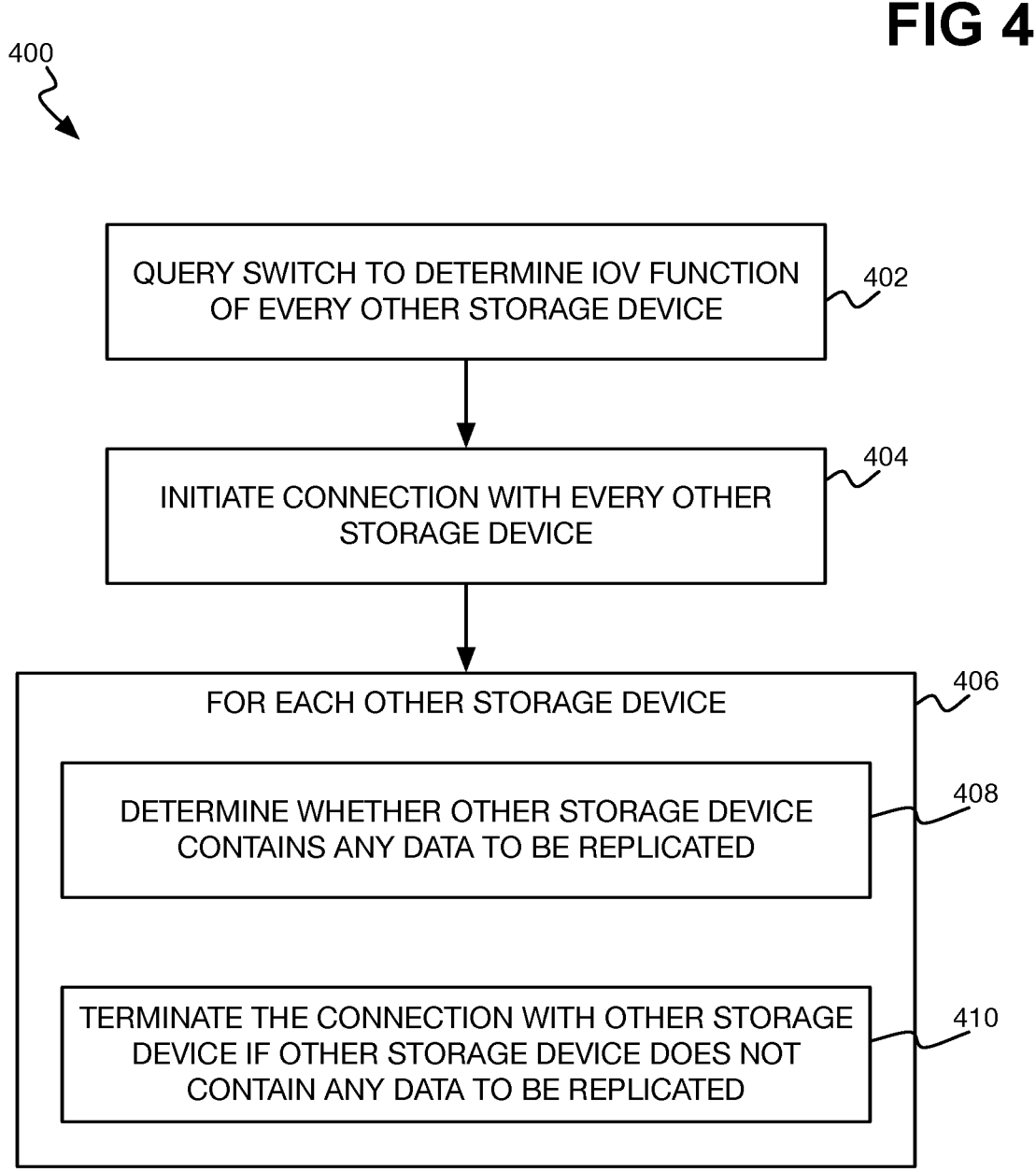
FIG. 4 is a flowchart of an example method for logically connecting a replacement PCIe storage device to the existing PCIe storage devices from which the replacement storage device is to copy data within the method of FIG. 3.
Figure 5:
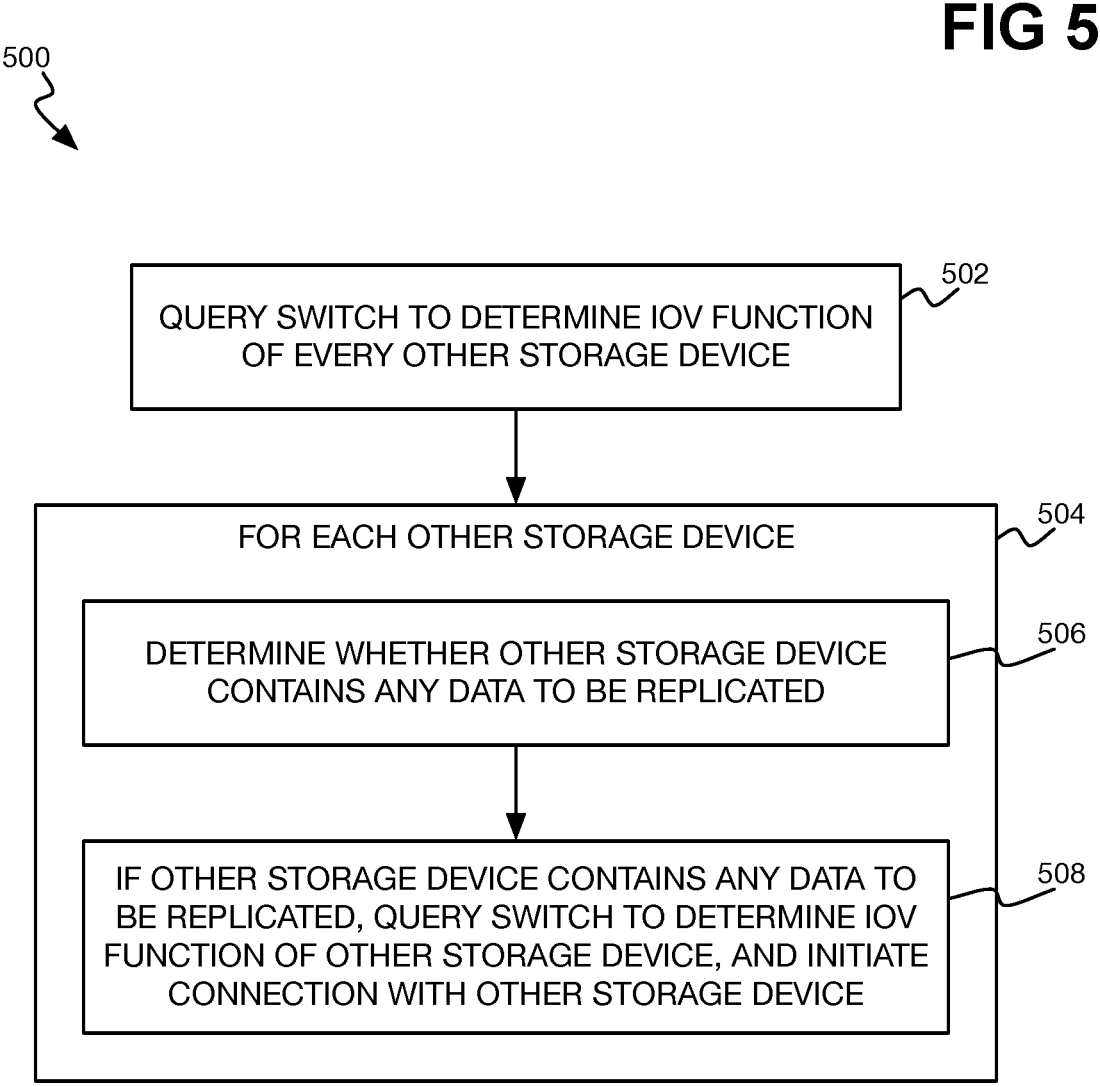
FIG. 5 is a flowchart of another example method for logically connecting a replacement PCIe storage device to the existing PCIe storage devices from which the replacement storage device is to copy data within the method of FIG. 3.

FIGS. 4 and 5 respectively show example methods 400 and 500 by which the virtual complex on the replacement PCIe storage device 202 can initiate connections with the other PCIe storage devices 104 that store data to be replicated to the storage device 202. In the method 400, the virtual complex initiates connections with all the storage devices 104, regardless of whether or not the data that they contain will be copied to the storage device 202, and then disconnects the connection to each storage device 104 from which data will not be replicated. By comparison, in the method 500, the virtual complex does not initiate connections with every storage device 104, regardless of whether or not the data that the storage devices 104 contain will be copied to the storage device 202. Rather, the virtual complex initiates connections just with those storage devices 104 from which the virtual complex will replicate data.

In the method 400 of FIG. 4 specifically, the virtual complex can query the PCIe switch 102 to determine the IOV function (i.e., SR IOV or MR IOV function) of every storage device 104 (still) connected to the switch 102 (402). The IOV function may be considered as a virtual port of PCIe storage device 104 having a physical PCIe port that is interconnected to a physical PCIe port 116 of the switch 102. The virtual complex then initiates connections to these PCI storage devices 104, via their IOV functions (404).

The virtual complex performs the following for each storage device 104 (406). The virtual complex determines whether the storage device 104 in question contains data that is to be replicated to the storage device 202 (408). For example, the virtual complex may query the storage device 104 to obtain metadata as to the data stripes that the storage device 104. If the storage device 104 does not contain any data that the virtual complex has to replicate from the particular storage device 104 in question, then the virtual complex terminates the connection with that storage device 104 (410). For example, the virtual complex may query the PCIe switch 102 to disconnect the virtual complex from the storage device 104.

The virtual complex may in part 406 proceed through the storage devices 104 in the port (or IOV function) order in which they are connected to the PCI switch 102. The virtual complex may further in one implementation copy just one data stripe from any given storage device 104. Therefore, in the example of FIG. 2, the virtual complex first queries the storage device 104B, and determines that it contains the data stripes B and E that are to be copied to the storage device 202. The virtual complex then queries the storage device 104C, and determines that it contains the data stripe D that is to be copied to the storage device 202. In this example, although the storage devices 104B and 104C together include all the data stripes that are to be replicated, just one data stripe B or E can be replicated from the storage device 104B.

Therefore, the virtual complex queries the storage device 104D, and determines that it contains the data stripes B and E like the storage device 104B does. As such, the virtual complex may replicate the data stripe B from the storage device 104B and the data stripe E from the storage device 104D, or vice-versa. The virtual complex thus does not have to replicate any data from the storage device 104E, and can terminate its connection with the storage device 104E.

In the method 500 of FIG. 5 specifically, the virtual complex can again query the PCIe switch 102 to determine the IOV function of every storage device 104 (still) connected to the switch 102 (502). The virtual complex performs the following for each storage device 104 (504). The virtual complex determines whether the storage device 104 in question contains data that is to be replicated to the storage device 202 (506).

This process is similar to that described in relation to part 408 of the method 400, but the virtual complex does not receive the metadata indicating what data stripes are stored on a particular storage device 104 form the storage device 104 itself. This is because the virtual complex has not yet initiated a connection with any storage device 104. Therefore, the virtual complex may query the PCIe switch 102, or receive such metadata in a different manner. If the storage device 104 contains any data that is to be replicated from that storage device 104, the virtual complex can then query the PCIe switch 102 to learn the IOV function of the storage device 104, and via this IOV function initiate a connection with the storage device 104 (508).

The techniques that have been described thus provide for higher performance when a PCIe storage device is replaced within a replication cluster in the context of a PCIe switch fabric. Rather than having a host processor connected to the PCIe switch copy data to the new PCIe storage device via the hardware root complex, the new PCIe storage device instead spawns its own virtual root complex. The virtual root complex then copies the data to the new PCIe storage device, and then is disabled so that the storage device can become an endpoint to the hardware root complex.

It is finally noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. Examples of computer-readable media include both volatile such media, like volatile semiconductor memories, as well as non-volatile such media, like non-volatile semiconductor memories and magnetic storage drives. It is manifestly intended that this invention be limited only by the claims and equivalents thereof.

We claim:

1. A non-transitory computer-readable data storage medium storing program code executable by a storage device to:
   determine that the storage device, connected to a Peripheral Component Interconnect Express (PCIe) switch, is part of an input/output virtualization (IOV) replication cluster, wherein storage device is replacing another storage device in the IOV replication cluster connected to the PCIe switch and wherein the IOV replication cluster comprises a plurality of storage devices connected to the PCIe switch;
   in response to determining that the storage device was part of the IOV replication cluster, initiate a virtual root complex on the storage device;
   initiate, by the virtual root complex, a connection through the PCIe switch with each other storage device connected to the PCIe switch and containing data to be replicated on the storage device, wherein each other storage device is an endpoint to the virtual root complex;
   receive and store, by the virtual root complex, the data to be replicated on the storage device from each other storage device containing the data, over the connection;

terminate, by the virtual root complex, the connection with each other storage device containing the data; and in response to terminating the connection with each other storage device containing the data, disable the virtual root complex on the storage device and enabling the storage device as another endpoint.

2. The non-transitory computer-readable data storage medium of claim 1, wherein the data is replicated to the storage device without involving a hardware root complex connected to the PCIe switch, and without involving a host processor connected to the hardware root complex.

3. The non-transitory computer-readable data storage medium of claim 1, wherein the executable is code is executable by the storage device to determine that the storage device is part of the IOV replication cluster by querying the PCIe switch to determine that the storage device is part of the IOV replication cluster.

4. The non-transitory computer-readable data storage medium of claim 1, wherein the executable is code is executable by the storage device to initiate the connection with each other storage device containing the data to be replicated by:

querying, by the virtual root complex, the PCIe switch to determine an IOV function of every other storage device connected to the PCIe switch;

initiating, by the virtual root complex, a connection with every other storage device connected to the PCIe switch via the IOV function thereof; and for each other storage device connected to the PCIe switch:

determining, by the virtual root complex, whether the other storage device contains any data to be replicated on the storage device; and in response to determining that the other storage devices does not contain any data to be replicated on the storage device, terminating, by the virtual root complex, the connection with the other storage device.

5. The non-transitory computer-readable data storage medium of claim 1, wherein the executable is code is executable by the storage device to initiate the connection with each other storage device containing the data to be replicated by:

querying, by the virtual root complex, the PCIe switch to determine an IOV function of every other storage device connected to the PCIe switch; and for each other storage device connected to the PCIe switch:

determining, by the virtual root complex, whether the other storage device contains any data to be replicated on the storage device;

in response to determining that the other storage device contains contain any data to be replicated on the storage device:

querying, by the virtual root complex, the PCIe switch to determine an IOV function of the other storage device; and initiating, by the virtual root complex, a connection with the other storage device via the IOV function thereof.

6. The non-transitory computer-readable data storage medium of claim 1, wherein the executable is code is executable by the storage device to terminate the connection with each other storage device containing the data by querying, by the virtual root complex, the PCIe switch to terminate the connection with each other storage device containing the data.

7. The non-transitory computer-readable data storage medium of claim 1, wherein the IOV replication cluster is a multiple root (MR) IOV replication cluster, the virtual root complex on the storage device concurrently existing with a hardware root complex connected to the PCIe switch and to a host processor and memory.

8. The non-transitory computer-readable data storage medium of claim 1, wherein the IOV replication cluster is a single root (SR) IOV replication cluster, the virtual root complex on the storage device temporarily replacing a hardware root complex connected to the PCIe switch and to a host processor and memory.

9. A system comprising:

a Peripheral Component Interconnect Express (PCIe) switch connectable to a hardware root complex that is connected to a host processor; and a plurality of storage devices connected to the PCIe switch and forming an input/output virtualization (IOV) replication cluster as exposed to the host processor via the hardware root complex, each storage device being an endpoint to the hardware root complex, wherein upon replacement of a failed storage device of the storage device connected to the PCIe switch with a new storage device connected to the PCIe switch, the new storage device is configured to initiate connections with other storage devices of the IOV replication cluster that contain data that was replicated on the failed storage device, and receive and store the data on the new storage device.

10. The system of claim 9, wherein the new storage device is configured to initiate the connections with the other storage devices, receive the data from the other storage devices, and store the data, without involving the hardware root complex and without involving the host processor.

11. The system of claim 9, wherein the PCIe switch is configured to temporarily disconnect the hardware root complex to the other storage devices, and the new storage device is configured to initiate a virtual root complex by which the connections with the other storage devices are initiated as endpoints to the virtual root complex, wherein after the data is received and stored, the new storage device is configured to disable the virtual root complex and enable the new storage device as an endpoint to the hardware root complex, and the PCIe is configured to reconnect the hardware root complex to the other storage devices, wherein the IOV is single root (SR) IOV, the virtual root complex temporarily replacing the hardware root complex.

12. The system of claim 9, wherein while the hardware root complex is connected to the other storage devices, the new storage device is configured to initiate the virtual root complex by which the connections with the other storage devices are initiated as endpoints to the virtual root complex, wherein after the data is received and stored, the new storage device is configured to disable the virtual root complex and enable the new storage device as an endpoint to the hardware root complex, wherein the IOV is multiple root (MR) IOV, the virtual root complex temporarily supplementing the hardware root complex.

13. The system of claim 9, wherein the new storage device is configured to initiate a virtual root complex by which the connections with the other storage devices are initiated, and wherein the virtual root complex is configured to initiate the connections by:

querying the PCIe switch to determine an IOV function of every other storage device connected to the PCIe switch;

initiate a connection with every other storage device connected to the PCIe switch via the IOV function thereof;

for each other storage device connected to the PCIe switch:

determining, by the virtual root complex, whether the other storage device contains any data to be replicated on the new storage device; and in response to determining that the other storage devices does not contain any data to be replicated on the new storage device, terminating the connection with the other storage device.

14. The system of claim 9, wherein the new storage device is configured to initiate a virtual root complex by which the connections with the other storage devices are initiated, and wherein the virtual root complex is configured to initiate the connections by:

querying the PCIe switch to determine an IOV function of every other storage device connected to the PCIe switch;

for each other storage device connected to the PCIe switch:

determining whether the other storage device contains any data to be replicated on the new storage device;

in response to determining that the other storage device contains contain any data to be replicated on the new storage device:

querying the PCIe switch to determine an IOV function of the other storage device; and initiating a connection with the other storage device via the IOV function thereof.

15. The system of claim 9, wherein upon the replacement of the failed storage device with the new storage device, the new storage device is configured to determine that the failed storage device that the new storage device is replacing was a part of the IOV replication cluster, before initiating the connections with the other storage device.

16. The system of claim 9, wherein after the new storage device has received and stored the data from the other storage devices, the new storage device is configured to terminate the connections with the other storage devices.

17. The system of claim 9, further comprising the hardware root complex and the host processor.

18. A storage device comprising:

a port to connect to a Peripheral Component Interconnect Express (PCIe) switch to which a plurality of other storage devices are connected;

one or more physical storage media on which the storage device is configured to store data; and hardware logic configured to, upon connection of storage device to the PCIe switch to replace a failed storage device connected to the PCIe switch:

determine that the storage device is to become part of an IOV replication cluster with the other storage devices;

responsively initiate connections with the other storage devices that contain the data to be replicated on the storage device;

after initiating the connections, receive and store the data from the other storage devices that contain the data; and after receiving and storing the data, terminate the connections with the other storage devices that contain the data.

19. The storage device of claim 18, wherein the data is replicated onto the storage device without involving a hardware root complex connected to the PCIe switch, and without involving a host processor connected to the hardware root complex.

20. The storage device of claim 18, wherein after determining that the storage device is configured to become part of the IOV replication cluster, the hardware logic is configured to initiate a virtual root complex to which the other storage devices that contain the data are initiated are connected as endpoints.

* * * * *